(12) United States Patent
Fernández Alonso et al.

(10) Patent No.: US 7,089,010 B2
(45) Date of Patent: Aug. 8, 2006

(54) METHOD AND APPARATUS FOR PRESENTATION OF CALLING SUBSCRIBER NUMBER IN MOBILE NETWORKS

(75) Inventors: Susana Fernández Alonso, Madrid (ES); Fuencisla García Azorero, Madrid (ES)

(73) Assignee: Telefonaktiebolaget L M Ericsson, Stockholm (SE)

( * ) Notice: Subject to any disclaimer, the term of this patent is extended or adjusted under 35 U.S.C. 154(b) by 700 days.

(21) Appl. No.: 10/025,409

(22) Filed: Dec. 19, 2001

(65) Prior Publication Data

US 2002/0115441 A1 Aug. 22, 2002

(30) Foreign Application Priority Data

Dec. 27, 2000 (EP) .................................. 00128505

(51) Int. Cl.
*H04Q 7/20* (2006.01)
(52) U.S. Cl. ...................................... 455/445; 455/414
(58) Field of Classification Search ............ 455/414.1, 455/415, 445, 432.1, 433
See application file for complete search history.

(56) References Cited

U.S. PATENT DOCUMENTS 5,915,222 A * 6/1999 Olsson et al. ................ 455/466
5,930,701 A * 7/1999 Skog .......................... 455/415
5,974,309 A   10/1999 Foti
6,101,382 A * 8/2000 Granberg ................. 455/414.1
6,408,181 B1 * 6/2002 Ho et al. .................. 455/432.1
6,625,453 B1 * 9/2003 Dai et al. ..................... 455/445
6,745,029 B1 * 6/2004 Lahtinen et al. ......... 455/432.1

FOREIGN PATENT DOCUMENTS

WO     WO 97 44981 A1     11/1997
WO     WO 99 09760 A1      2/1999

* cited by examiner

*Primary Examiner*—Joseph Feild
*Assistant Examiner*—S. Smith
(74) *Attorney, Agent, or Firm*—Buchanan Ingersoll PC (57) ABSTRACT

Methods and apparatus for reliable transmission of a calling subscriber number ("A-numbery") received at a Gateway Mobile Switching Center ("GMSC") of a home Public Land Mobile Network ("PLMN") along with an incoming call towards a roaming destination subscriber are disclosed. A GSM network entity, an UMTS network entity, and/or an Inter-Working Function is selected and interrogated by a GSM and/or UMTS MAP operation to retrieve a routing number, and to further reach the roaming subscriber and set up the call. The interrogation of the entity includes extracting the previously received A-number at the interrogating network entity, including the A-number in the interrogating GSM/UMTS MAP operation at the interrogating network entity, and forwarding the interrogation and the A-number with the interrogating GSM/UMTS MAP operation to the interrogated entity.

11 Claims, 10 Drawing Sheets

```
SendRoutingInfoArg ::= SEQUENCE {
    msisdn                              [0]  ISDN-AddressString,
    cug-CheckInfo                       [1]  CUG-CheckInfo               OPTIONAL,
    numberOfForwarding                  [2]  NumberOfForwarding          OPTIONAL,
    interrogationType                   [3]  InterrogationType,
    or-Interrogation                    [4]  NULL                        OPTIONAL,
    or-Capability                       [5]  OR-Phase                    OPTIONAL,
    gmsc-Address                        [6]  ISDN-AddressString,
    callReferenceNumber                 [7]  CallReferenceNumber         OPTIONAL,
    forwardingReason                    [8]  ForwardingReason            OPTIONAL,
    basicServiceGroup                   [9]  Ext-BasicServiceCode        OPTIONAL,
    networkSignalInfo                   [10] ExternalSignalInfo          OPTIONAL,
    camelInfo                           [11] CamelInfo                   OPTIONAL,
    suppressionOfAnnouncement           [12] SuppressionOfAnnouncement   OPTIONAL,
    extensionContainer                  [13] ExtensionContainer          OPTIONAL,
    ...,
    alertingPattern                     [14] AlertingPattern             OPTIONAL,
    ccbs-Call                           [15] NULL                        OPTIONAL,
    supportedCCBS-Phase                 [16] SupportedCCBS-Phase         OPTIONAL,
    additionalSignalInfo                [17] Ext-ExternalSignalInfo      OPTIONAL,
    istSupportIndicator                 [18] IST-SupportIndicator        OPTIONAL,
    pre-pagingSupported                 [19] NULL                        OPTIONAL,
    callDiversionTreatmentIndicator     [20] CallDiversionTreatmentIndicator OPTIONAL,
    longFTN-Supported                   [21] NULL                        OPTIONAL,
    callingSubscriberNumber             [22] ISDN-AddressString          OPTIONAL
}
```

FIG.-9.

```
ProvideRoamingNumberArg ::= SEQUENCE {
    imsi                          [0]   IMSI,
    msc-Number                    [1]   ISDN-AddressString,
    msisdn                        [2]   ISDN-AddressString,
    lmsi                          [4]   LMSI,
    gsm-BearerCapability          [5]   ExternalSignalInfo           OPTIONAL,
    networkSignalInfo             [6]   ExternalSignalInfo           OPTIONAL,
    suppressionOfAnnouncement     [7]   SuppressionOfAnnouncement    OPTIONAL,
    gmsc-Address                  [8]   ISDN-AddressString           OPTIONAL,
    callReferenceNumber           [9]   CallReferenceNumber          OPTIONAL,
    or-Interrogation              [10]  NULL                         OPTIONAL,
    extensionContainer            [11]  ExtensionContainer           OPTIONAL,
    ...,
    alertingPattern               [12]  AlertingPattern              OPTIONAL,
    ccbs-Call                     [13]  NULL                         OPTIONAL,
    supportedCamelPhasesInGMSC    [15]  SupportedCamelPhases         OPTIONAL,
    additionalSignalInfo          [14]  Ext-ExternalSignalInfo       OPTIONAL,
    orNotSupportedInGMSC          [16]  NULL                         OPTIONAL,
    pre-payingSupported           [17]  NULL                         OPTIONAL,
    longFTN-Supported             [18]  NULL                         OPTIONAL,
    callingSubscriberNumber       [19]  ISDN-AddressString           OPTIONAL
}
```

FIG.-10-

METHOD AND APPARATUS FOR PRESENTATION OF CALLING SUBSCRIBER NUMBER IN MOBILE NETWORKS

BACKGROUND

The present invention pertains to the technical field of methods and apparatus to be used for presentation of calling subscriber number identification in mobile networks when calls pass through other intermediate networks, and particularly to the technical field of methods and apparatus aimed to avoid that said calling subscriber number identification is lost due to the lack of means in said intermediate networks for transferring such identification data.

The present invention provides the necessary steps and means to transfer said calling subscriber number identification data through a network enabling such a transmission, like the mobile network, and by protocol means separate from the call.

Most of the currently existing mobile networks make use of the Integrated Services Digital Network (hereinafter referred to as ISDN) and its corresponding ISDN User Part protocol (hereinafter abbreviated as ISUP) to switch and transfer calls, both internally within the mobile network and externally to or from other networks. In this respect, particular ISDN numbers identify individual subscribers of an ISDN-based network. Moreover, some mobile networks like the Global System Mobile network (generally known and hereinafter referred to as GSM) and the Universal Mobile Telecommunications System (generally known and hereinafter referred to as UMTS) identify their own subscribers by a Mobile Subscriber ISDN Number (generally known and hereinafter referred to as MSISDN).

Nowadays, UMTS is considered the third generation (hereinafter abbreviated as 3G) of mobile systems to which the current second generation (hereinafter abbreviated as 2G) of mobile systems is converging. An appropriate example of a 2G mobile system is the above mentioned GSM. Still another example of 2G mobile systems is the Pan-American mobile system based on the Interim Standard number 41 (generally known and hereinafter referred to as IS-41). Both GSM and IS-41 based networks are evolving towards the UMTS network. Nevertheless, these and other mobile systems of different generations should still co-exist and communicate each other. Still another 3G mobile network is the Pan-American system based on Code Division Multiple Access (generally known and hereinafter referred to as CDMA2000) to which 2G Pan-American mobile systems are also evolving.

In a similar manner as UMTS and CDMA2000 inherit most of the features and services already existing in the 2G mobile systems, the latter had inherited services from ISDN. For instance, ISDN supports several Supplementary Services related to the presentation of ISDN numbers, which were already included in mobile systems like GSM or IS-41 based systems, and which will still be supported by UMTS and CDMA2000, and other systems. Examples of these ISDN supplementary Services supported also in such mobile networks are commented below:

i) Calling Line Identification Presentation (hereinafter referred to as CLIP) is a supplementary service that provides the ability of indicating the ISDN number of the calling line, namely the calling subscriber, with possible additional sub-address information to the called party. It is also named Calling Number Identification Presentation (CNIP) under some standards.

ii) Calling Line Identification Restriction (hereinafter referred to as CLIR) is a supplementary service that precludes the presentation of the calling line identification if the calling user has an arrangement to inhibit such a presentation of his or her number to the called party.

iii) Connected Line Identification Presentation (hereinafter referred to as COLP) is a supplementary service that provides the ability to the calling party to present the connected party's ISDN number, namely the called or connected subscriber.

iv) Connected Line Identification Restriction (hereinafter referred to as COLR) is a supplementary service offered to the called party to restrict the presentation of the connected line, namely the called subscriber or another forwarded-to number, to the calling party.

When invoking the CLIP supplementary service, the information to be transferred by ISUP to the destination end side is provided by the originating end user in the SETUP message and sent as part of the basic call procedures. In the case when the calling user provides no information, the network shall provide the default number associated with the user access in the originating local exchange. This calling number is transferred through the ISUP network to the destination end side and provided to the called user at call set-up.

In addition to this call-establishment related signalling through ISUP, mobile specific signalling is exchanged between different mobile network entities to appropriately route the call to or from the area where the mobile subscriber is currently roaming. In this respect, the standard signalling messages and message parameters involved in said specific mobile signalling are described in the Mobile Application Part (hereinafter referred to as MAP) specification 29.002 v3.4.0 issued by the 3GPP Technical Specification Group Core Network (hereinafter said specification is referred to as 3GPP TS 29.002).

BRIEF DESCRIPTION OF THE DRAWINGS

The accompanying drawings disclose, on the one hand, embodiments of prior art and, on the other, features, objects and advantages of the present invention which will become especially apparent by reading this description in conjunction with said accompanying drawings, in which.

DETAILED DESCRIPTION

As already mentioned above, the CLIP service is also defined in mobile networks like GSM, or IS-41, or UMTS, or CDMA2000, as well as in ISDN based fixed networks, but the execution is dependent on the call delivery mechanisms.

Figure 1:
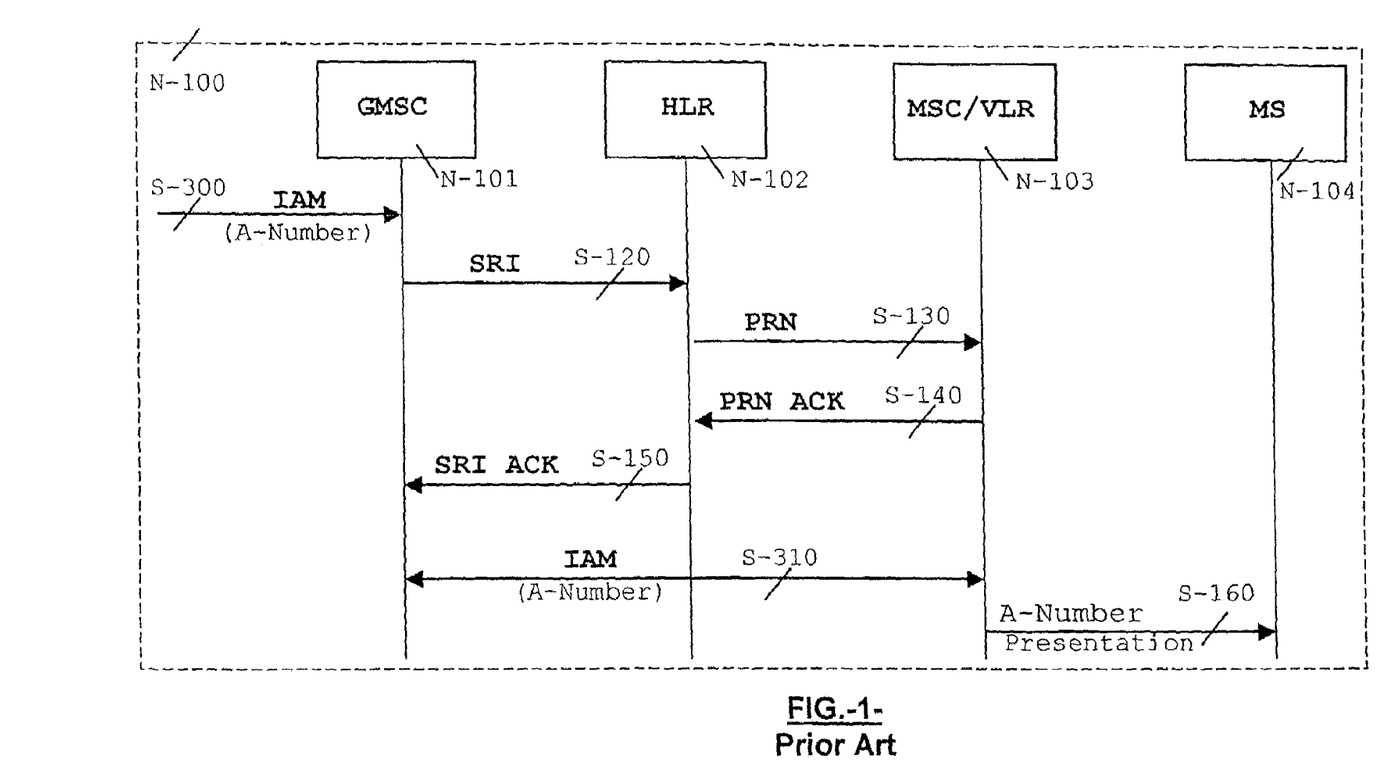
FIG. 1 schematically illustrates the signalling flow in a prior art scenario for call establishment mechanism in a GSM/UMTS network.

In this respect, FIG. 1 schematically illustrates the prior art mechanism for call delivery to mobile subscribers of GSM or UMTS networks (N-100). The signalling flow in accordance with FIG. 1 is as follows:

1. The "Initial Address Message" (S-300) (hereinafter referred to as IAM message) is received in the Gateway Mobile Switching Centre (N-101) (hereinafter referred to as GMSC) of a GSM or UMTS based Public Land Mobile Network (N-100) (hereinafter referred to as PLMN). The calling subscriber number, generally known as A-number by the telecommunications community, received in said IAM is kept at the GMSC.
2. The GMSC (N-101) requests a routing number to the Home Location Register (N-102) (hereinafter referred to as HLR) by sending a "Send Routing Info" signalling message (S-120) (hereinafter referred to as SRI). At this point, and for the sake of clarity throughout the present specification, it has to be mentioned that a more complex entity than the HLR is introduced for UMTS release 2000, currently known as the Home Subscriber Server (HSS). However, for UMTS release 99 said entity is still referred to as HLR. For the purpose of the present invention, all references are made to the HLR, as those skilled in the art will appreciate that both HLR and HSS are found to be equivalent from this perspective of the invention.
3. The HLR (N-102) then forwards such a request to the Mobile Switching Centre (N-103), in which the called subscriber is currently registered, by means of a "Provide Roaming Number" signalling message (S-130) (hereinafter referred to as PRN). This Mobile Switching Centre (hereinafter MSC) could be a standalone MSC or collocated with a Visitor Location Register (hereinafter VLR) wherein subscriber data are stored for subscribers currently roaming in the area served by said VLR. When the MSC and the VLR are collocated, they are represented by an entity referred to as MSC/VLR. For the purpose of the present invention, the Mobile Switching Centre is hereinafter referred to as MSC/VLR, irrespective of whether it is standalone or collocated.
4. The MSC/VLR (N-103) returns back to the HLR (N-102) the requested roaming number in the "Acknowledge to PRN" (S-140) message (hereinafter PRN ACK).
5. The HLR (N-102) then forwards to the GMSC (N-101) said roaming number as the requested routing number in the "Acknowledge to SRI" (S-150) message (hereinafter SRI ACK).
6. Then, the GMSC (N-101) continues the call establishment towards the MSC/VLR (N-103). The calling subscriber number (hereinafter referred to as A-number) is included in the IAM (S-310) ISUP message.
7. Eventually, once the A-Number digits are received with the "IAM" message (S-310) in the MSC/VLR (N-103), the call is set (S-160) at the Mobile Station (N-104) (hereinafter MS) of the called subscriber. Provided that the called subscriber has the CLIP service provisioned, such an A-number is presented in the terminal.

Figure 2:
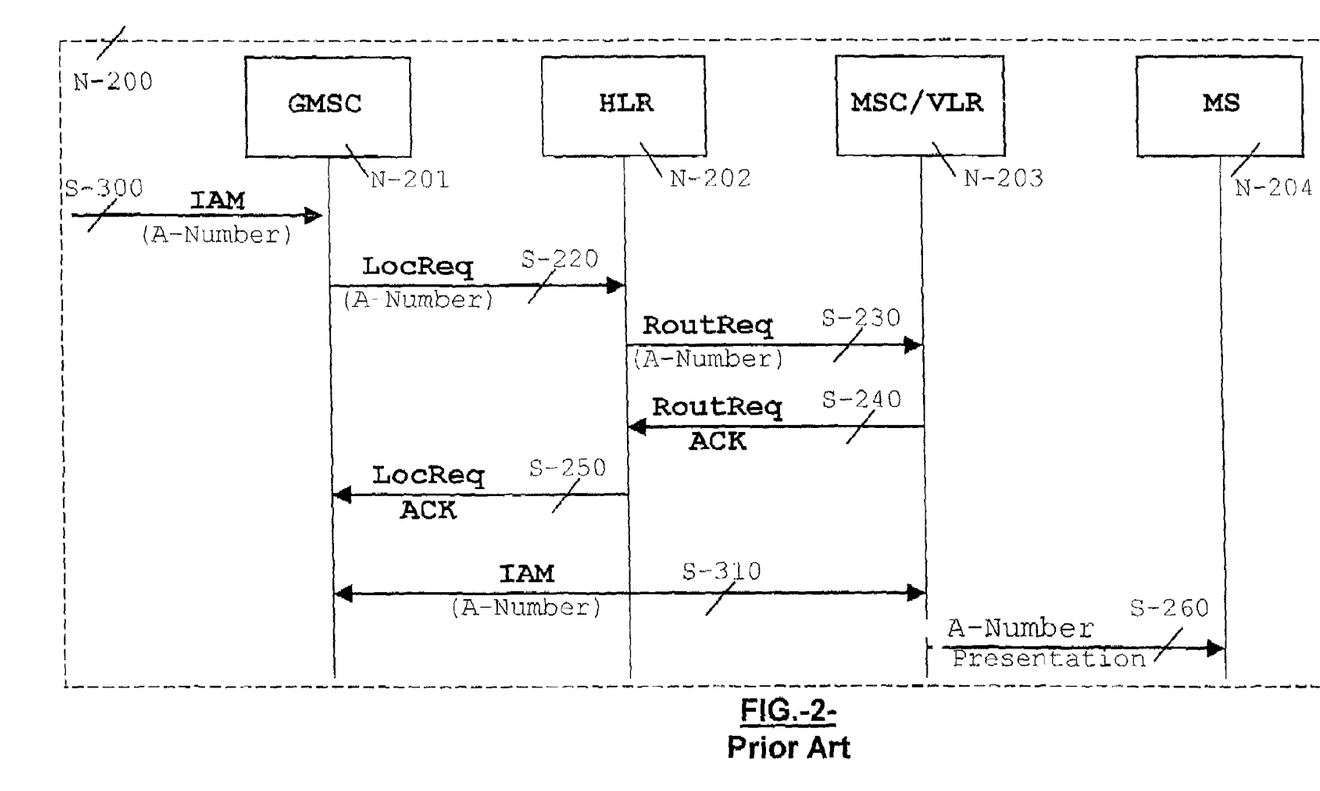
FIG. 2 schematically illustrates the signalling flow in a prior art scenario for call establishment mechanism in an IS-41/CDMA2000 network.

Another mechanism for call delivery, slightly different than the one previously described for GSM or UMTS, is the one currently existing for IS-41 based systems which is also applicable for CDMA2000 based networks. Typically, the mechanism for call delivery in IS-41 or CDMA2000 based systems (N-200) is schematically illustrated in FIG. 2 wherein the signalling flow is as follows:

1. The "IAM" message (S-300) is received in the Gateway Mobile Switching Centre (N-201) (hereinafter referred to as GMSC) of a CDMA2000 or IS-41 based Public Land Mobile Network (N-200) (hereinafter referred to as PLMN). The calling subscriber number, generally known as A-number by the telecommunications community, received in said IAM is kept at the GMSC.
2. The GMSC (N-201) requests a routing number by sending a "Location Request" signalling message (S-220) (hereinafter referred to as LocReq) to the Home Location Register (N-202) (hereinafter referred to as HLR). The A-Number, namely the calling subscriber number, is included in said LocReq message.
3. The HLR (N-202) then forwards such a request to the Mobile Switching Centre (N-203), in which the called subscriber is currently registered, by means of a "Routing Request" signalling message (S-230) (hereinafter referred to as RoutReq). The A-Number is also included in said RoutReq message. This Mobile Switching Centre (hereinafter MSC) could be a standalone MSC or collocated with a Visitor Location Register (hereinafter VLR) wherein subscriber data are stored for subscribers currently roaming in the area served by said VLR. When the MSC and the VLR are collocated, they are represented by an entity referred to as MSC/VLR. For the purpose of the present invention, the Mobile Switching Centre is hereinafter referred to as MSC/VLR, irrespective of whether it is standalone or collocated, and independently of the applicable family of standards.
4. The MSC/VLR (N-203) returns back to the HLR (N-202) the requested roaming number in the "Acknowledge to RoutReq" (S-240) message (hereinafter RoutReq ACK).
5. The HLR (N-202) then forwards to the GMSC (N-201) said roaming number as the requested routing number in the "Acknowledge to LocReq" (S-250) message (hereinafter LocReq ACK).
6. Then, the GMSC (N-201) continues the call establishment towards the MSC/VLR (N-203). The calling subscriber number, namely the A-number, is included in the IAM (S-310) ISUP message.
7. Eventually, once the A-Number digits are received with the IAM message (S-310) in the MSC/VLR (N-203), the call is set (S-260) at the Mobile Station (N-204) (hereinafter MS) of the called subscriber. Provided that the called subscriber has the CNIP service provisioned, such an A-number is presented in the terminal.

Naturally, these two families of mobile networks above (GSM/UMTS, and CDMA2000/IS-41) as well as other networks based on comparable and compatible systems have to co-exist and communicate with each other. Nowadays, well-known and different inter-working functions provide the means for inter-system roaming of subscribers between these and others of such network families. In this respect, an inter-working function is nowadays logically placed between a first network like GSM and a second network like IS-41 to allow GSM mobile subscribers to roam into an IS-41 network and viceversa. To this end, subscribers of a first network should not only be registered into their own HLR, but also be registered into the corresponding Inter-Working Function (hereinafter referred to as IWF). Said IWF acts as a VLR from a Home PLMN perspective, and acts as an HLR from the Visited PLMN perspective. Moreover, said IWF is in charge of mapping protocol operations as well as subscriber data.

Figure 3:
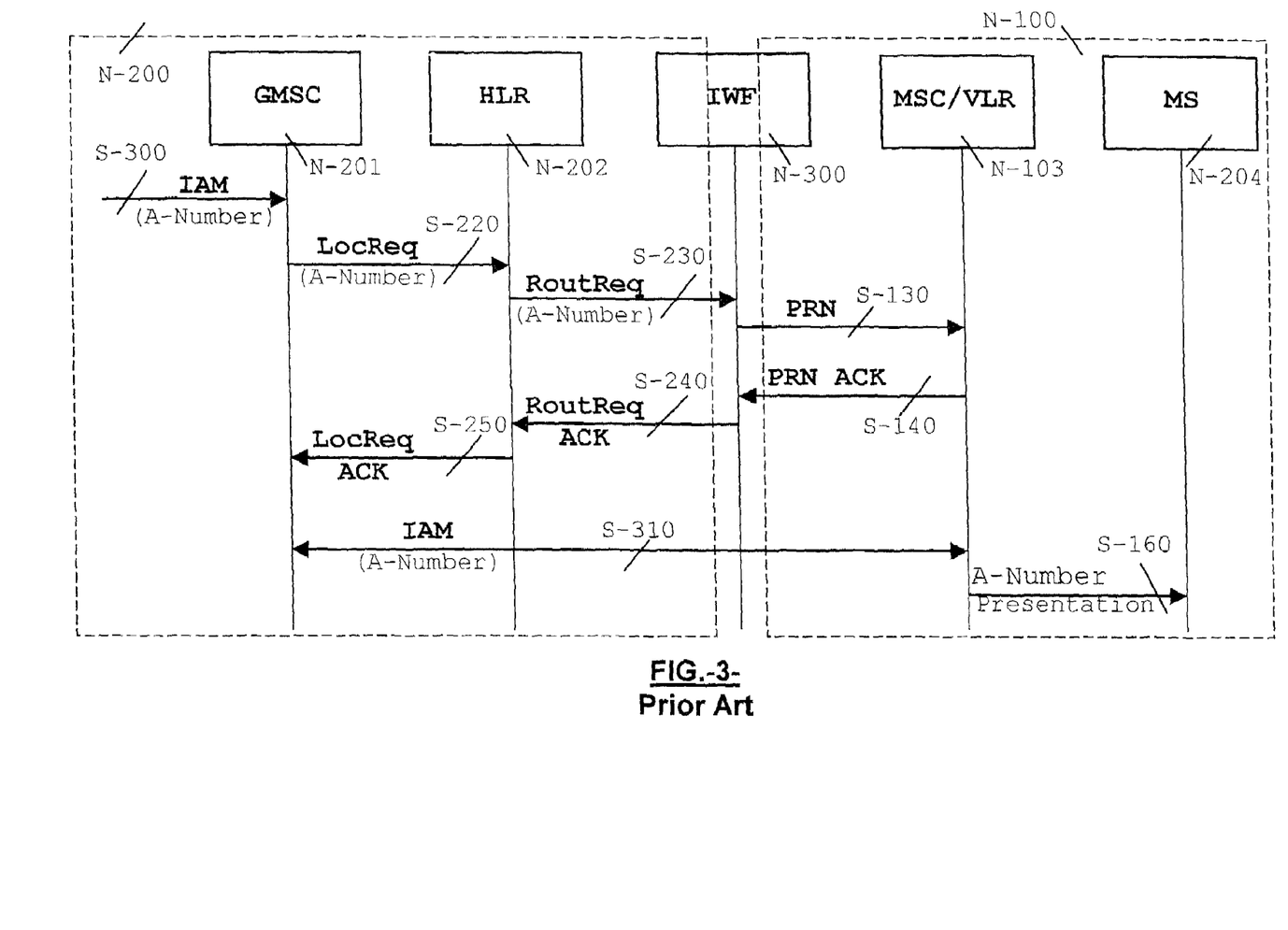
FIG. 3 schematically illustrates the signalling flow in a prior art scenario for call establishment mechanism under intersystem roaming when an IS-41/CDMA2000 subscriber roams in a GSM/UMTS network.

As an example, FIG. 3 schematically shows the signalling flow when a subscriber of an IS-41/CDMA2000 system based network (N-200) roams into a GSM/UMTS system based network (N-100). In accordance with FIG. 3, the signalling flow is as follows:

1. The "IAM" message (S-300) is received in the GMSC (N-201) of a CDMA2000 or IS-41 based PLMN (N-200). The calling subscriber number (A-number) received in said IAM is kept at the GMSC.
2. The GMSC (N-201) requests a routing number by sending a "LocReq" signalling message (S-220) to the HLR (N-202). The A-Number is included in said LocReq message.
3. The HLR (N-202) forwards such a request to the Inter-Working Function (N-300) (hereinafter referred to as IWF), in which the called subscriber is also registered, by means of a "RoutReq" signalling message (S-230). The A-Number is also included in said RoutReq message.
4. The IWF (N-300) then forwards such a request to the MSC/VLR (N-103) of a GSM or UMTS based network, in which the called subscriber is currently registered, by means of a "PRN" signalling message (S-130). The A-number is disregarded by said IWF.
5. The MSC/VLR (N-103) returns back to the IWF (N-300) the requested roaming number in the "PRN ACK" (S-140) message.
6. The IWF (N-300) then returns back to the HLR (N-202) the requested roaming number in the "RoutReq ACK" (S-240) message.
7. The HLR (N-202) then forwards to the GMSC (N-201) said roaming number as the requested routing number in the "LocReq ACK" (S-250) message.
8. Then, the GMSC (N-201) continues the call establishment towards the MSC/VLR (N-103). The A-number is included in the IAM (S-310) ISUP message.
9. Eventually, once the A-Number digits are received with the IAM message (S-310) in the MSC/VLR (N-103), the call is set (S-160) at the Mobile Station (N-204) of the called subscriber. Provided that the called subscriber has the CNIP service provisioned, such an A-number is presented in the terminal.

Figure 4:
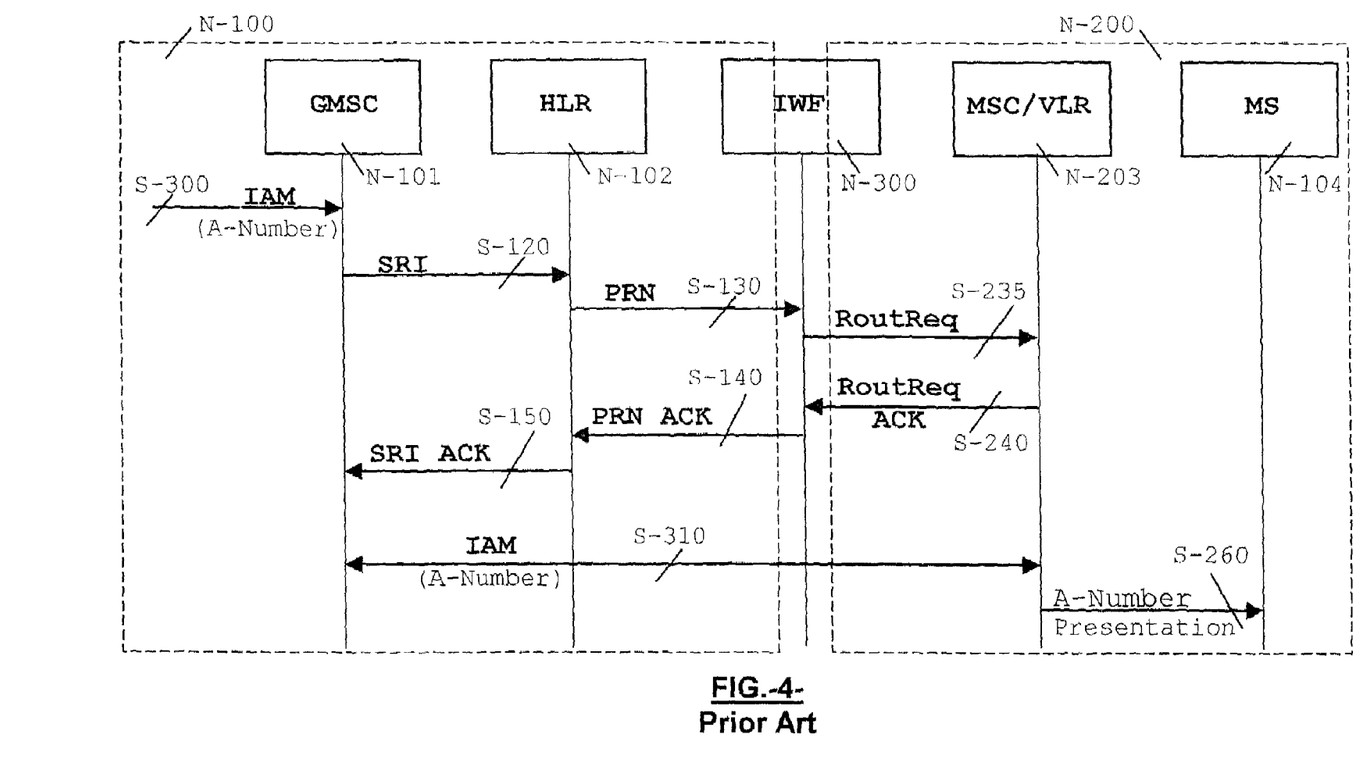
FIG. 4 schematically illustrates the signalling flow in a prior art scenario for call establishment mechanism under intersystem roaming when a GSM/UMTS subscriber roams in an IS-41/CDMA2000 network.

Still another example of the performance of prior art systems is schematically illustrated in FIG. 4 wherein a subscriber of a GSM/UMTS system based network (N-100) roams into an IS-41/CDMA2000 system based network (N-200). In accordance with FIG. 4, the signalling flow is as follows:

1. The "IAM" message (S-300) is received in the GMSC (N-101) of a GSM or UMTS based PLMN (N-100). The calling subscriber number (A-number) received in said IAM is kept at the GMSC.
2. The GMSC (N-101) requests a routing number by sending an "SRI" signalling message (S-120) to the HLR (N-102).
3. The HLR (N-102) forwards such a request to the Inter-Working Function (N-300) (hereinafter referred to as IWF), in which the called subscriber is also registered, by means of a "PRN" signalling message (S-130).
4. The IWF (N-300) then forwards such a request to the MSC/VLR (N-203) of an IS-41 or CDMA2000 based network, in which the called subscriber is currently registered, by means of a "RoutReq" signalling message (S-235). The A-number is not submitted by said IWF given that said data was not received in the "PRN" message.
5. The MSC/VLR (N-203) returns back to the IWF (N-300) the requested roaming number in the "RoutReq ACK" (S-240) message.
6. The IWF (N-300) then returns back to the HLR (N-102) the requested roaming number in the "PRN ACK" (S-140) message.
7. The HLR (N-102) then forwards to the GMSC (N-101) said roaming number as the requested routing number in the "SRI ACK" (S-150) message.
8. Then, the GMSC (N-101) continues the call establishment towards the MSC/VLR (N-203). The A-number is included in the "IAM" (S-310) ISUP message.
9. Eventually, once the A-Number digits are received with the "IAM" message (S-310) in the MSC/VLR (N-203), the call is set (S-260) at the Mobile Station (N-104) of the called subscriber. Provided that the called subscriber has the CLIP service provisioned, such an A-number is presented in the terminal.

Typically, the Calling Line Identification services (also known as Calling Number Identification services in Pan-American standards, and abbreviated as CNIP) are popular and common services which people have become familiar to.

The fact that calling subscriber number cannot be presented to the called subscriber under certain roaming conditions may be perceived by the user as an anomalous network behaviour. In this respect, there are operators such as Japan Telecom with high rates of roaming subscribers (either visitor subscribers into its own network or own subscribers roaming into other operator networks).

It is worth highlighting that, for example in North America, the called party may pay for the call and, as a direct consequence, it is very important for the called subscriber to know the number of the calling entity. North-American operators, without having been given any appropriate solution yet, have boosted the needs for ensuring the reception of calling subscriber numbers at the called mobile subscriber side in any circumstance. This service exists in both network families, namely GSM/UMTS and IS-41/CDMA2000, and therefore the IWF will provide the mapping between the GSM/UMTS CLIP and the IS-41/CDMA2000 CNIP. However, this conversion is not enough in order to guarantee the A-Number presentation service in the visited network. Such a number presentation related service is nowadays rather dependent on the fix network capabilities (e.g. TUP/ISUP connections) than on the mobile network. At present, the ISDN exchanges support the A-number transmission though, under certain circumstances, said A-number could be lost. Typically, there are transit exchanges and some international exchanges that do not perform the transmission of the A-number, especially when behaving as transit networks. This assumption may be justified on the fact that no individual subscriber charging applies, but rather network accounting principles wherein the originating network pays the transit network and charges the originating own subscriber. Under this assumption, the transit network does not need the A-number and can, consequently, disregard such an A-number. Nevertheless, ISUP is always supposed to support the transmission of the A-number.

When the subscriber of a GSM/UMTS network has provision for CLIP service, said subscriber receives the A-number only through ISUP signalling, whereas such an A-number is not sent via the corresponding GSM MAP message. However, when the subscriber of an IS-41 based network has provision for CNIP service, said subscriber receives the A-number via the corresponding IS-41 MAP messages, what makes the IS-41 protocol independent from the transit network capabilities (e.g. connection between IS-41 GMSC and IS-41 MSC/VLR).

On the other hand, there are still many exchanges that only inter-work through Channel Associated Signalling trunks (hereinafter referred to as CAS). Moreover, there are still many exchanges that only support Multi-Frequency signalling (hereinafter referred to as MF) like R2 based signalling system. Neither CAS nor MF based signalling support the transmission of A-number between exchanges, and this is an important drawback for some scenarios related to mobile communications. For example, when the scenarios imply international roaming or intersystem roaming, the probability of the connection between GMSC and MSC/VLR going through one of such exchanges only supporting CAS or MF increase considerably. Furthermore, the probability of not transmitting the A-number from said exchanges is also considerably high.

For an intersystem roaming scenario, since the switches involved at call establishment belong to different systems, a complete ISUP connection between them cannot be guaranteed, and therefore the A-Number presentation cannot be ensured. An explanatory call establishment for an intersystem roaming scenario is basically illustrated in FIG. 5 wherein specific roaming cases are pointed out, explaining how the A-number can be lost.

Figure 5:
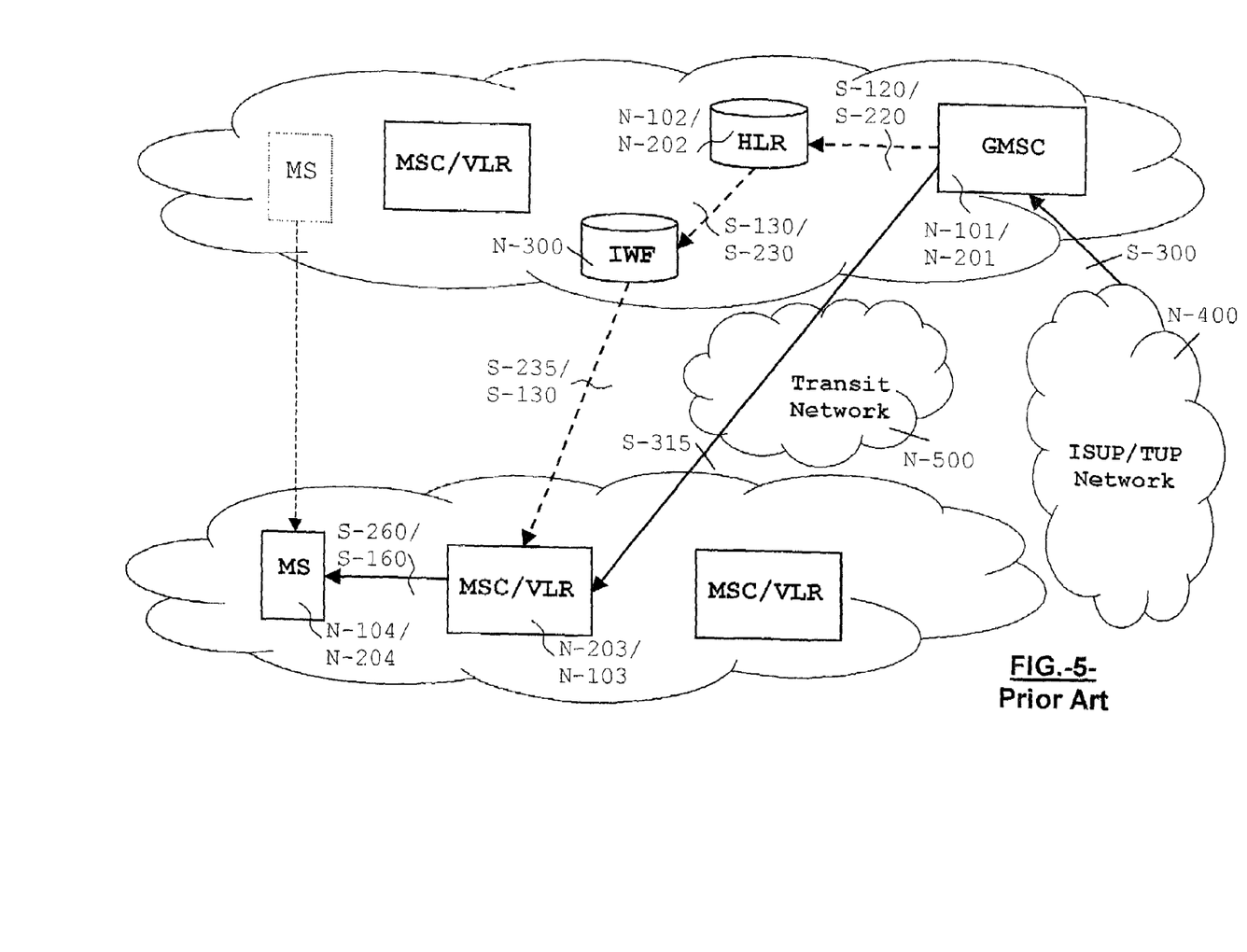
FIG. 5 basically illustrates exemplary prior art call establishment for intersystem roaming scenarios, explaining how the A-number can be lost.

A first roaming case illustrated in FIG. 5 assumes a GSM/UMTS subscriber roaming into an IS-41 network. The call and signalling flow in accordance to FIG. 5 is as follows:
1. An "IAM" message (S-300) is received at a GSM/UMTS GMSC (N-101) from an ISUP or advanced TUP network (N-400) able to transmit the A-number.
2. The GSM/UMTS GMSC (N-101) sends the GSM/UMTS MAP message "Send Routing Information" (S-120) to the GSM/UMTS HLR (N-102). This message does not carry the A-Number.
3. The GSM/UMTS HLR (N-102) sends the GSM/UMTS MAP operation "Provide Roaming Number" (S-130) to the IWF (N-300). This message does not carry the A-Number.
4. The IWF (N-300) sends the IS-41 MAP operation "Routing Request" (S-235) to the IS-41 MSC/VLR (N-203) asking for the routing number. Since the A-Number was not received from the GSM/UMTS Network, the IWF will not provide this number towards the IS-41 Network.
5. Once the requested data to route the call are returned by the corresponding protocol means to the GSM/UMTS GMSC (N-101), the call is then established. The GSM/UMTS GMSC (N-101) will send the A-Number in an "IAM" message (S-315) through the ISUP interface to the IS-41 MSC/VLR (N-203). However, said A-number will be lost if there is any CAS or MF system based exchange in the likely used Transit Network (N-500) between both mobile system networks.

Another roaming case also illustrated in FIG. 5 assumes an IS-41 subscriber roaming into a GSM/UMTS network. The call and signalling flow in accordance to FIG. 5 is as follows:
1. An "IAM" message (S-300) is received at the IS-41 GMSC (N-201) from an ISUP or advanced TUP network (N-400) able to transmit the A-number.
2. The IS-41 GMSC (N-201) sends the IS-41 MAP message "Location Request" (S-220) to the IS-41 HLR (N-202). Said message carries the A-Number.
3. The IS-41 HLR (N-202) sends the IS-41 MAP message "Routing Request" (S-230) to the IWF (N-300). Said message carries the A-Number received in the previous message.
4. The IWF (N-300) sends the GSM/UMTS MAP operation "Provide Roaming Number" (S-130) to the GSM/UMTS MSC/VLR (N-103) asking for the routing number. Said A-Number was received from the IS-41 network, but the IWF (N-300) will not provide this number towards the GSM/UMTS network since the corresponding GSM/UMTS MAP messages are not prepared for that purpose.
5. Once the requested data to route the call are returned by the corresponding protocol means to the IS-41 GMSC (N-201), the call is then established. The IS-41 GMSC (N-201) will send the A-Number in an IAM message (S-315) through the ISUP interface towards the GSM/UMTS MSC/VLR (N-103). However, said A-number will be lost as in previous roaming case if there is any CAS or MF system based exchange in the likely used Transit Network (N-500) between both mobile system networks.

As already explained herein before, the main drawback behind a full support of calling line or calling number presentation in some mobile networks derives from the capabilities of fixed networks acting as transit networks between co-operating mobile systems.

The present invention is intended to overcome the aforementioned and other drawbacks of prior art by means of the features of which will be generally described hereinafter.

Thus, on the one hand, the present invention relates to a method for transmission of a calling subscriber number received at a Gateway Mobile Switching Centre (GMSC) of a home Public Land Mobile Network (PLMN) along with an incoming call towards a destination subscriber who is roaming subscriber in a visited Public Land Mobile Network, said destination subscriber being one of a called subscriber and a forwarded-to subscriber, the method comprising at least one step of interrogating at least one entity selected from GSM network entities, UMTS network entities and Inter-Working Functions by means of at least one interrogating operation selected from GSM MAP operations, UMTS MAP operations and combinations thereof, in order to retrieve a routing number, and. to further reach said roaming subscriber and set up the call;

wherein the step of interrogating at least one of GSM network entities, UMTS network entities and Inter-Working Functions by means of said interrogating GSM/UMTS MAP operations includes the steps of:

extracting the previously received calling subscriber number identification, to be further sent in an interrogating GSM/UMTS operation, at the interrogating network entity;

including said calling subscriber number identification in the interrogating GSM/UMTS MAP operation at the interrogating network entity; and forwarding said interrogation and said calling subscriber number identification with the interrogating GSM/UMTS MAP operation to said at least one interrogated entity.

In accordance with the method of the invention the interrogating GSM/UMTS MAP operation for retrieving the routing number as well as to submit the calling subscriber number identification can be a MAP operation: "Send Routing Information" and/or a MAP operation: "Provide Roaming Number".

The method of the present invention is applicable, for instance, when the home PLMN is one of a GSM network and a UMTS network comprising a home GMSC, and the visited PLMN where the home subscriber is roaming, is neither a GSM nor a UMTS network. In this case, the home GMSC may interrogate a GSM/UMTS HLR by means of a MAP operation: "Send Routing Information" that comprises the calling subscriber number identification data. In this case, the GSM/UMTS HLR interrogates an Inter-Working Function used in intersystem roaming by means of a MAP operation: "Provide Roaming Number" that also comprises the calling subscriber number identification data.

The method of the present invention is also applicable where the visited PLMN where the home subscriber is roaming, is one of a GSM network and a UMTS network, and the home PLMN is neither a GSM nor a UMTS network. In this case, an Inter-Working Function used in intersystem roaming may interrogate a visited MSC/VLR by means of a MAP operation: "Provide Roaming Number" that comprises the calling subscriber number identification data. The GSM and UMTS MSC/VLR may store on a per subscriber and per call basis, the calling subscriber number identification received in a MAP operation: "Provide Roaming Number", in order to be further delivered to the destination subscriber.

The method of the present invention is also applicable where the home PLMN is one of a GSM network and a UMTS network comprising a home GMSC, and the visited PLMN where the home subscriber is roaming, is also one of a GSM network and a UMTS network. In this case, the home GMSC may interrogate a GSM/UMTS HLR by means of a MAP operation: "Send Routing Information" that comprises the calling subscriber number identification data, and the GSM/UMTS HLR may interrogate the MSC/VLR where the subscriber is roaming by means of a MAP operation: "Provide Roaming Number" that also comprises the calling subscriber number identification data. Also in this case, any of GSM and UMTS MSC/VLR may store on a per subscriber and per call basis, the calling subscriber number identification received in a MAP operation: "Provide Roaming Number", in order to be further delivered to the destination subscriber.

According to the method of the invention, the calling subscriber number identification may be included as a new parameter of specific type in said MAP operation: "Send Routing Information" and/or in an Extension Container field of said MAP operation: "Send Routing Information" instead of a new parameter of specific type. Also, the calling subscriber number identification may be included as a new parameter of specific type in said MAP operation: "Provide Roaming Number" and/or in an Extension Container field of said MAP operation: "Provide Roaming Number" instead of a new parameter of specific type.

The present invention also refers to an apparatus for transmission of a calling subscriber number identification received at a home Public Land Mobile Network (PLMN) or at an Inter-Working Function (IWF), the apparatus comprising first means for interrogating at least one entity selected from GSM network entities, UMTS network entities and Inter-Working Functions, by means of at least one interrogating operation selected from GSM MAP operations, UMTS MAP operations and combinations thereof, in order to retrieve a routing number, and to further reach a destination subscriber who is a roaming subscriber roaming in a visited Public Land Mobile Network, and set up the call, wherein the apparatus further comprises second means for extracting said calling subscriber number identification from a previously received signalling message and to be further sent in an interrogating operation selected from GSM MAP operations, UMTS MAP operations and combinations thereof; and third means for including said calling subscriber number identification obtained by said second means, in the interrogating GSM/UMTS MAP operation in order to retrieve a routing number, and to further reach such a roaming subscriber and to set up the call, presenting said calling subscriber number identification.

In an embodiment of the invention, the apparatus comprises means for storing on a per subscriber and per call basis, at any of GSM or UMTS entity, said calling subscriber number identification received in an interrogating GSM/UMTS MAP operation, in order to be further delivered to the destination subscriber.

The interrogating GSM/UMTS MAP operation may be a MAP operation: "Send Routing Information", said MAP operation being designed for including said calling subscriber number identification. The interrogating GSM/UMTS MAP operation may also be a MAP operation: "Provide Roaming Number" said MAP operation also being designed for including said calling subscriber number identification.

The apparatus is applicable to systems wherein the home PLMN is one of a GSM network and a UMTS network comprising a home GMSC, and the visited PLMN, where the home subscriber is roaming, is neither a GSM nor a UMTS network, in which case home GMSC interrogates a GSM/UMTS HLR by means of a MAP operation: "Send Routing Information" that comprises the calling subscriber number identification data, whilst the GSM/UMTS HLR interrogates an Inter-Working Function used in intersystem roaming by means of a MAP operation: "Provide Roaming Number" that also comprises the calling subscriber number identification data.

The apparatus of the invention is also applicable to systems wherein the visited PLMN where the home subscriber is roaming, is one of a GSM network and a UMTS network, and the home PLMN is neither a GSM nor a UMTS network, in which case an Inter-Working Function used in intersystem roaming interrogates a visited MSC/VLR by means of a MAP operation: "Provide Roaming Number" that comprises the calling subscriber number identification data.

The apparatus of the invention is furthermore applicable to systems wherein the home PLMN is one of a GSM network and a UMTS network comprising a home GMSC, and the visited PLMN where the home subscriber is roaming, is also one of a GSM network and a UMTS network. In this case the home GMSC interrogates a GSM/UMTS HLR by means of a MAP operation: "Send Routing Information" that comprises the calling subscriber number identification data, whilst the GSM/UMTS HLR interrogates the MSC/VLR where the home subscriber is roaming, by means of a MAP operation: "Provide Roaming Number" that also comprises the calling subscriber number identification data.

In the apparatus of the invention, the calling subscriber number identification may be included as a new parameter of specific type in said MAP operation: "Send Routing Information", or in an Extension Container field of said MAP operation: "Send Routing Information"; instead of a new parameter of specific type.

Alternatively or complementarily, the calling subscriber number identification may be included as a new parameter of specific type in said MAP operation: "Provide Roaming Number", or in an Extension Container field of said MAP operation: "Provide Roaming Number"; instead of a new parameter of specific type.

So as to provide further information on aspects, features and advantages, embodiments of the present invention will hereafter be described with reference to the accompanying drawings.

In accordance with an aspect of the present invention, a preferred embodiment refers to a new method and apparatus to achieve the call establishment with presentation of the calling subscriber number for a destination mobile subscriber in an intersystem roaming scenario. This preferred embodiment provides the means and method in such a manner that the A-Number is received in the visited network via MAP signalling. This way the A-Number transmission is independent from the signalling network. An exemplary call establishment for an intersystem roaming scenario is basically illustrated in FIG. 6 to FIG. 8, wherein specific roaming cases are pointed out, explaining how the A-number reaches the visited network via MAP signalling in order to be further presented to the destination subscriber.

Figure 8:
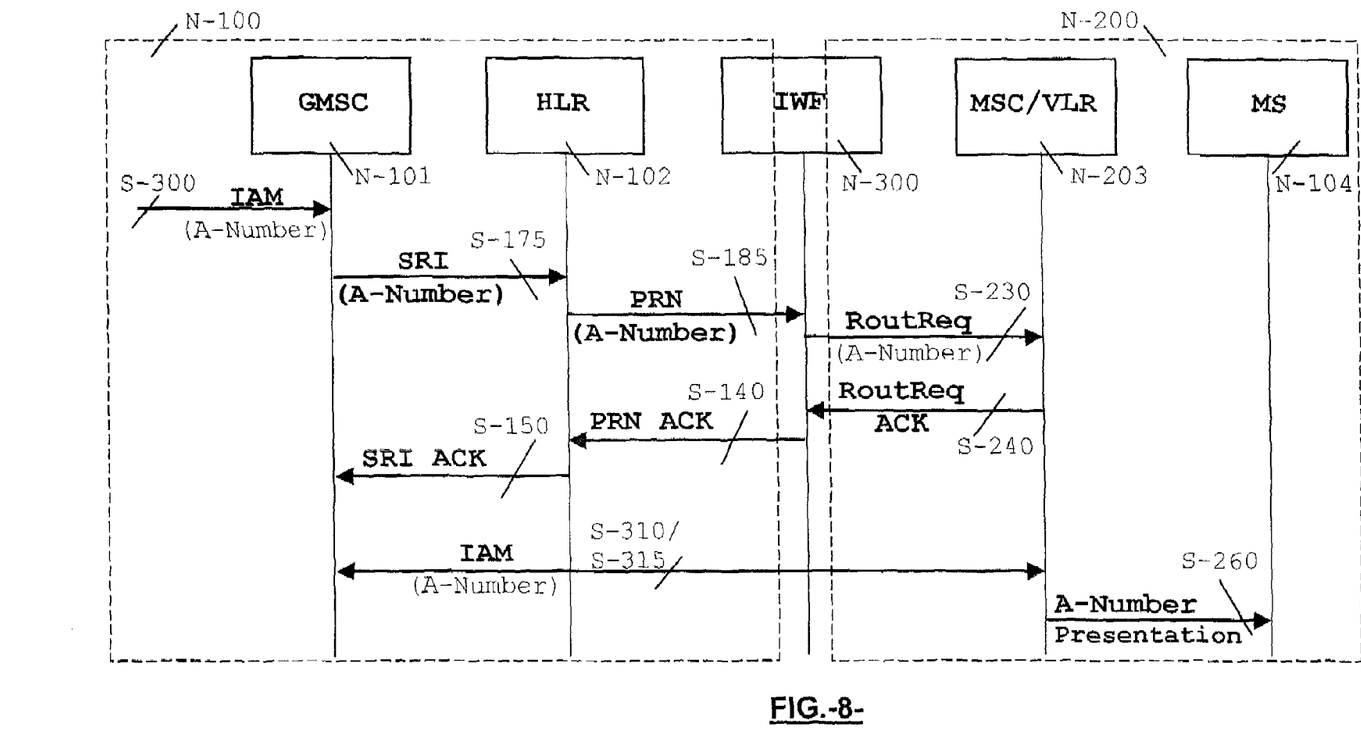
FIG. 8 schematically illustrates the signalling flow in accordance with the present invention for a call establishment mechanism under intersystem roaming when a GSM/UMTS subscriber roams in an IS-41/CDMA2000 network.

A first roaming case illustrated in FIG. 8 assumes a GSM/UMTS subscriber roaming into an IS-41 network. The call and signalling flow in accordance to FIG. 8 is as follows:

1. An "IAM" message (S-300) is received at a GSM/UMTS GMSC (N-101) from an ISUP or advanced TUP network able to transmit the A-number.
2. The GSM/UMTS GMSC (N-101) sends the GSM/UMTS MAP message "Send Routing Information" (S-175) to the GSM/UMTS HLR (N-102). In accordance to this preferred embodiment said MAP message comprises now the A-Number, namely the calling number identification.
3. The GSM/UMTS HLR (N-102) sends the GSM/UMTS MAP operation "Provide Roaming Number" (S-185) to the IWF (N-300). In accordance to this preferred embodiment said MAP message comprises now the A-Number, namely the calling number identification.
4. The IWF (N-300) sends the IS-41 MAP operation "Routing Request" (S-230) to the IS-41 MSC/VLR (N-203) asking for the routing number. Since the A-Number was already received from the GSM/UMTS Network, the IWF will provide said received A-number towards the IS-41 Network.
5. The MSC/VLR (N-203) returns back to the IWF (N-300) the requested roaming number in the "RoutReq ACK" (S-240) message.
6. The IWF (N-300) then returns back to the GSM/UMTS HLR (N-102) the requested roaming number in the "PRN ACK" (S-140) message.
7. The GSM/UMTS HLR (N-102) then forward to the GSM/UMTS GMSC (N-101) said roaming number as the requested routing number in the "SRI ACK" (S-150) message.
8. Once the requested data to route the call are returned with the corresponding protocol means to the GSM/UMTS GMSC (N-101), the call is then established. The GSM/UMTS GMSC (N-101) will send the A-Number in an "IAM" message (S-315, S-310) through the ISUP interface to the IS-41 MSC/VLR (N-203). In accordance to this preferred embodiment, said A-number had been previously received at the MSC/VLR (N-203) so that in case said A-number is lost through any transit network, such an A-number kept at said MSC/VLR could always be presented to the destination subscriber. Provided that the called subscriber has the CLIP service provisioned, such an A-number is presented in the terminal (S-260).

Figure 7:
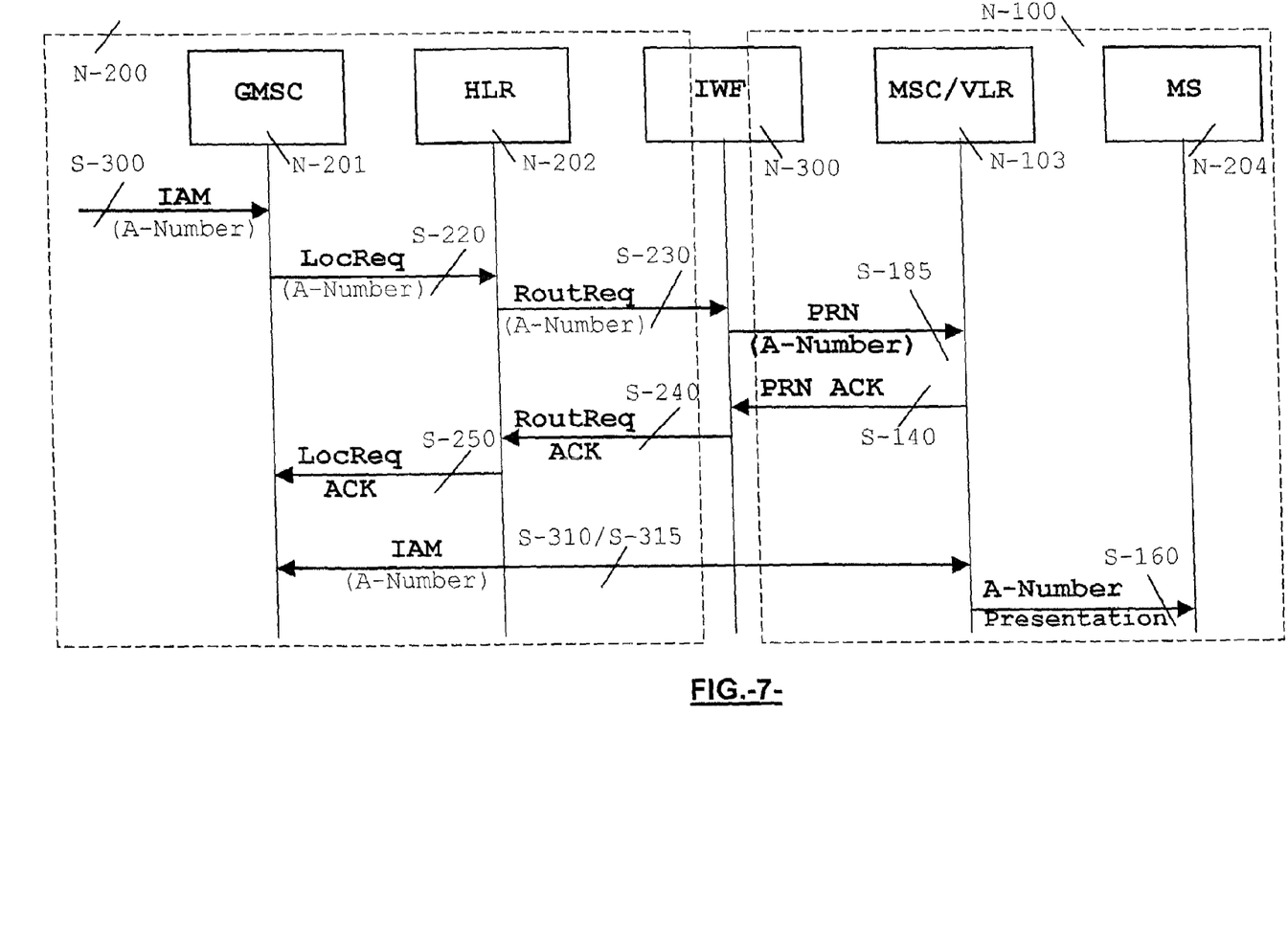
FIG. 7 schematically illustrates the signalling flow in accordance with the present invention for a call establishment mechanism under intersystem roaming when an IS-41/CDMA2000 subscriber roams in a GSM/UMTS network.

Another roaming case illustrated in FIG. 7 assumes an IS-41 subscriber roaming into a GSM/UMTS network. The call and signalling flow in accordance to FIG. 7 is as follows:

1. An "IAM" message (S-300) is received at the IS-41 GMSC (N-201) from an ISUP or advanced TUP network able to transmit the A-number.
2. The IS-41 GMSC (N-201) sends the IS-41 MAP message "Location Request" (S-220) to the IS-41 HLR (N-202). Said message carries the A-Number.
3. The IS-41 HLR (N-202) sends the IS-41 MAP message "Routing Request" (S-230) to the IWF (N-300). Said message carries the A-Number received in the previous message.
4. The IWF (N-300) sends the GSM/UMTS MAP operation "Provide Roaming Number" (S-185) to the GSM/UMTS MSC/VLR (N-103) asking for a roaming number. Given that such an A-Number was received from the IS-41 network, in accordance to this preferred embodiment the IWF (N-300) provides said A-number, namely the calling subscriber number identification, towards the GSM/UMTS network in such an appropriate GSM/UMTS MAP message. Also in accordance to this preferred embodiment, said A-number is stored in said GSM/UMTS MSC/VLR per subscriber and per call basis in order to be further retrieved.
5. The MSC/VLR (N-103) returns back to the IWF (N-300) the requested roaming number in the "PRN ACK" (S-140) message.
6. The IWF (N-300) then returns back to the HLR (N-202) the requested roaming number in the "RoutReq ACK" (S-240) message.
7. The HLR (N-202) then forwards to the GMSC (N-201) said roaming number as the requested routing number in the "LocReq ACK" (S-250) message.
8. Once the requested data to route the call are returned by the corresponding protocol means to the IS-41 GMSC (N-201), the call is then established. The GMSC (N-201) will send the A-Number in an IAM message (S-315, S-310) through the ISUP interface towards the GSM/UMTS MSC/VLR (N-103). In accordance to this preferred embodiment, said A-number had been previously received at the GSM/UMTS MSC/VLR (N-103), so that in case said A-number is lost through any transit network, such an A-number previously stored at said MSC/VLR (N-103) could always be presented to the destination subscriber. Provided that the called subscriber has the CNIP service provisioned, such an A-number is presented in the terminal (S-160).

Figure 6:
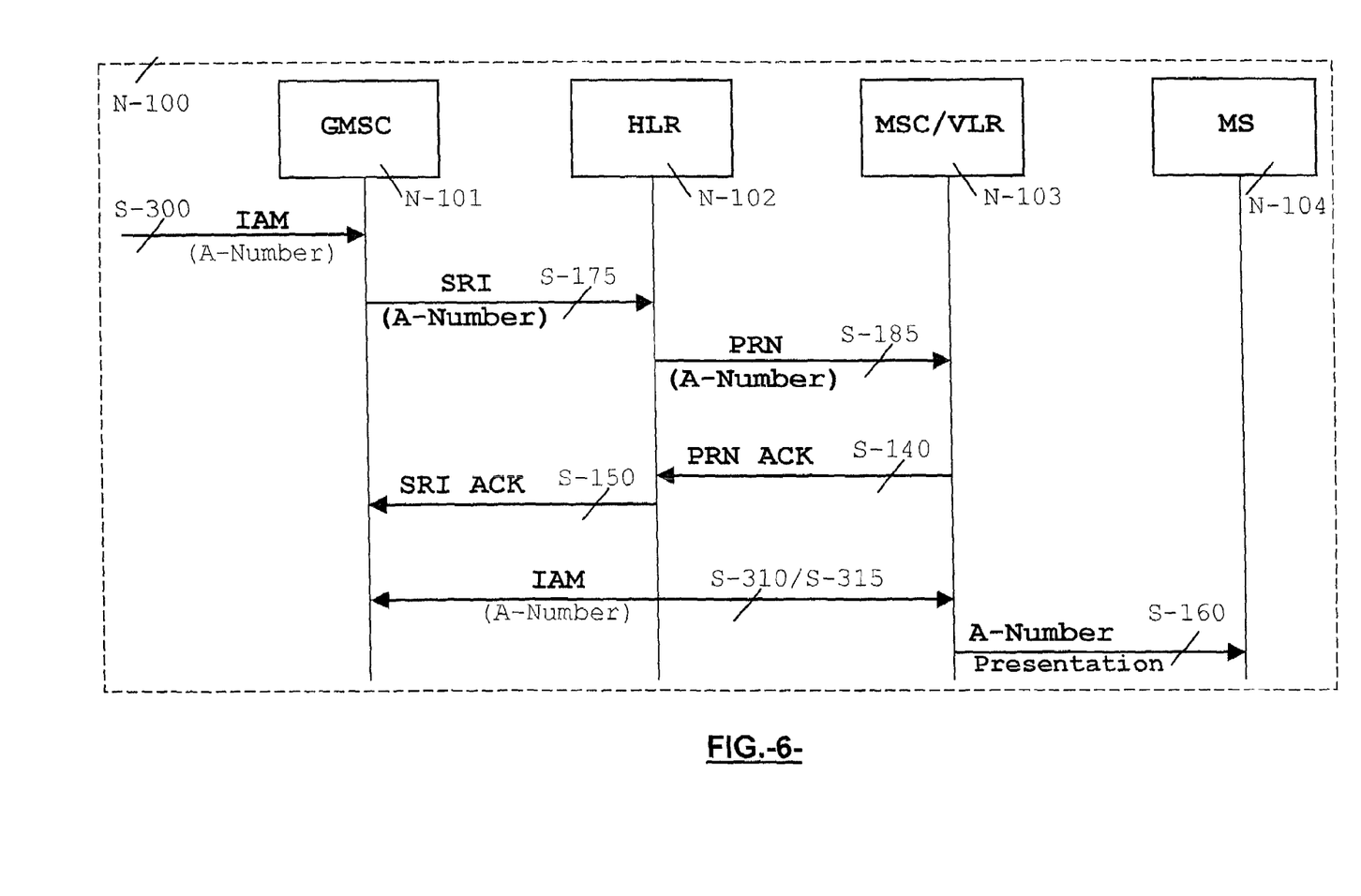
FIG. 6 schematically illustrates the required signalling flow in accordance with the present invention for call establishment mechanism in a GSM/UMTS network.

A further roaming case illustrated in FIG. 6 assumes a GSM/UMTS subscriber roaming into a GSM/UMTS network. The call and signalling flow in accordance to FIG. 6 is as follows:

1. An "IAM" message (S-300) is received at a GSM/UMTS GMSC (N-101) from an ISUP or advanced TUP network able to transmit the A-number.
2. The GSM/UMTS GMSC (N-101) sends the GSM/UMTS MAP message "Send Routing Information" (S-175) to the GSM/UMTS HLR (N-102). In accordance to this preferred embodiment said MAP message comprises now the A-Number, namely the calling number identification.
3. The GSM/UMTS HLR (N-102) sends the GSM/UMTS MAP operation "Provide Roaming Number" (S-185) to the GSM/UMTS MSC/VLR (N-103). In accordance to this preferred embodiment said MAP message comprises now the A-Number, namely the calling number identification. Also in accordance to this preferred embodiment, said A-number is stored in said GSM/UMTS MSC/VLR per subscriber and per call basis in order to be further retrieved.
4. The GSM/UMTS MSC/VLR (N-103) returns back to the GSM/UMTS HLR (N-102) the requested roaming number in the "PRN ACK" (S-140) message.
5. The GSM/UMTS HLR (N-102) then forward to the GSM/UMTS GMSC (N-101) said roaming number as the requested routing number in the "SRI ACK" (S-150) message.
6. Once the requested data to route the call are returned with the corresponding protocol means to the GSM/UMTS GMSC (N-101), the call is then established. The GSM/UMTS GMSC (N-101) will send the A-Number in an "IAM" message (S-315, S-310) through the ISUP interface to the GSM/UMTS MSC/VLR (N-103). In accordance to this preferred embodiment, said A-number had been previously received at the MSC/VLR (N-103) so that in case said A-number is lost through any transit network, such an A-number previously stored at said MSC/VLR could always be presented to the destination subscriber. Provided that the called subscriber has the CLIP service provisioned, such an A-number is presented in the terminal (S-160).

In accordance with another aspect of the present invention, and in order to make this solution possible, the Calling Subscriber Number Identification, namely the A-number, has to be included into the current GSM/UMTS MAP operations "Send Routing Information" and "Provide Roaming Number". The proposal of a preferred embodiment for this aspect of the present invention is that this data, namely the calling subscriber number identification, should be included a as new specific parameter within said GSM/UMTS MAP operations.

Figure 9:
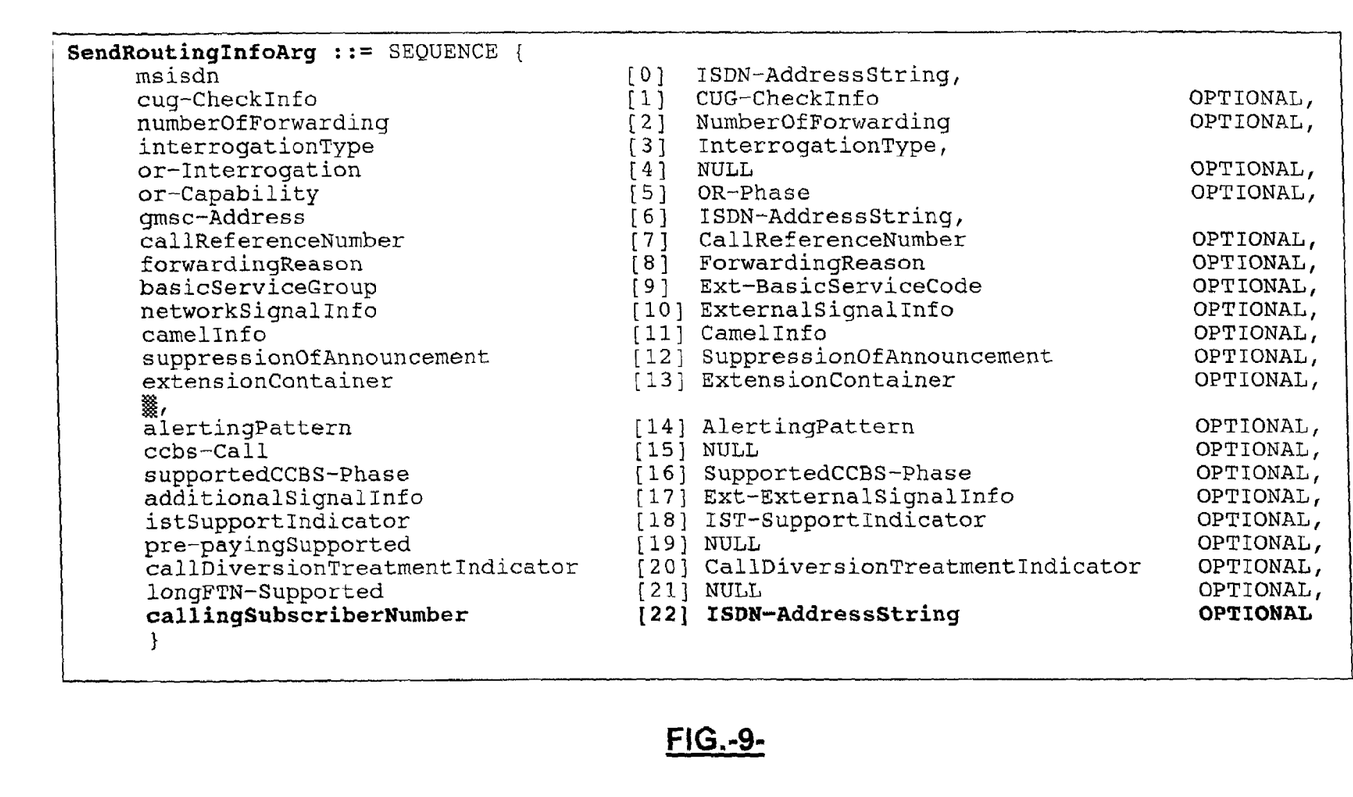
FIG. 9 basically presents the new MAP operation "Send_Routing_Info" in terms of Operation and Parameters, to be upgraded in the recommendations 3G TS 29.002 for UMTS and the corresponding ones for GSM, in accordance with a preferred embodiment of the present invention.

In accordance with the message and parameters format specified by 3G TS 29.002, the following new parameter should be included for the existing MAP message "SendRoutingInfo" in said specifications, 3G TS 29.002, as FIG. 9 states:

"a-Number" of type "[22] ISDN-AddressString".

Figure 10:
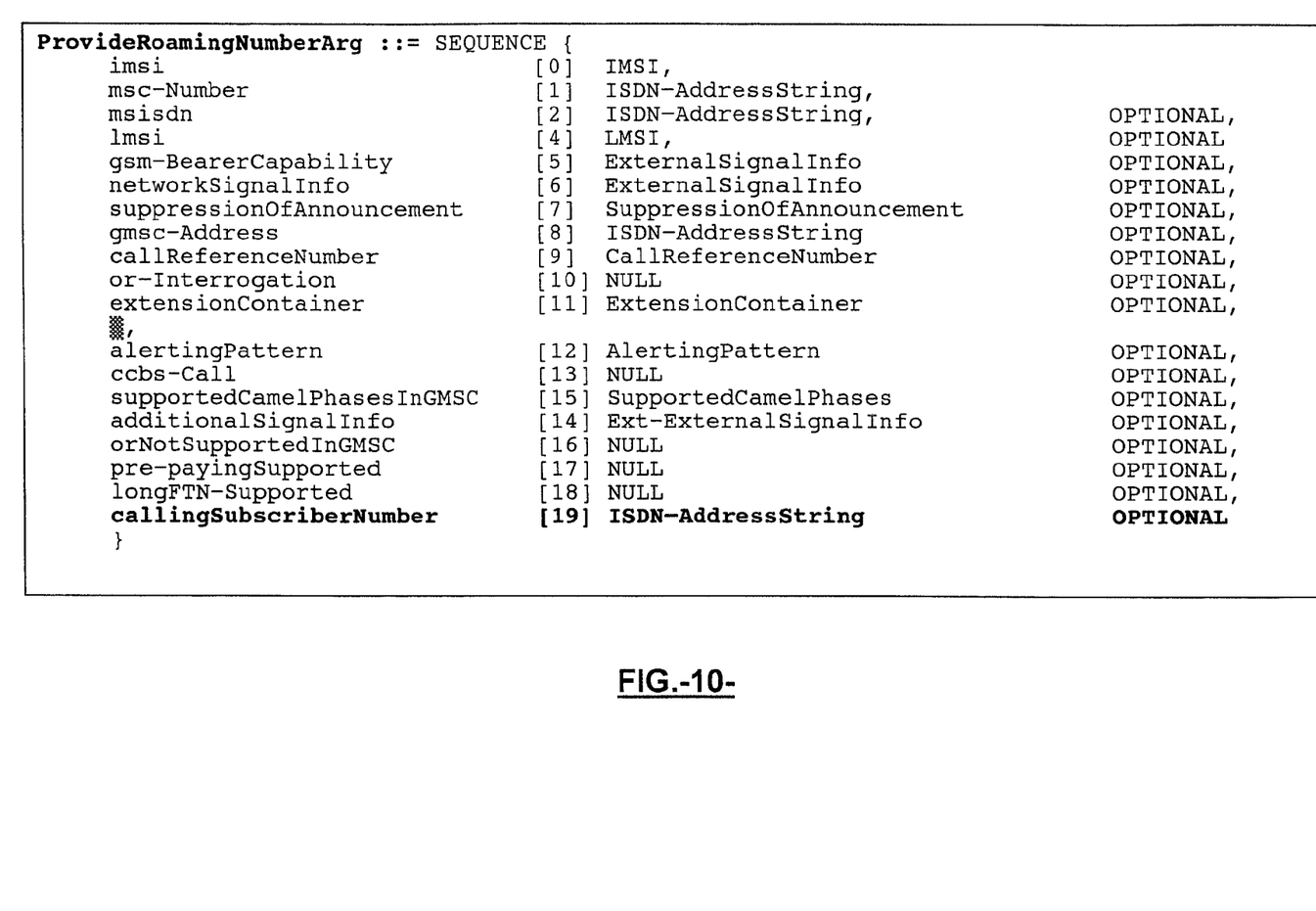
FIG. 10 basically presents the new MAP operation "Provide_Roaming_Number" in terms of Operation and Parameters, to be upgraded in the recommendations 3G TS 29.002 for UMTS and the corresponding ones for GSM, in accordance with a preferred embodiment of the present invention.

Moreover, the following new parameter should be included for the existing MAP message "ProvideRoamingNumber" in said specifications, 3G TS 29.002, as FIG. 10 states:

"a-Number" of type "[19] ISDN-AddressString".

These enumerated data should be understood in an illustrative and non-restrictive manner since, as those skilled in the art will appreciate, re-ordering or re-assigning said ordinal assignations will not substantially affect the object of the present invention under this preferred embodiment.

In this respect, still another embodiment of the present invention provides for the inclusion of these new data above within the Extension Container field. Said Extension Container field can be regarded as the means to introduce proprietary information in a standard message and thus, provided that the calling subscriber number identification is included there, the result will be a proprietary solution to some extent. This embodiment, unlike the preferred one presented in FIG. 9 and FIG. 10 does not offer comparable standardisation perspectives; however, it is still reasonable means for transmission of said calling subscriber number identification in said GSM/UMTS MAP messages.

The invention claimed is:

1. An apparatus for transmission of a calling subscriber number identification received at a home Public Land Mobile Network ("PLMN") or at an InterWorking Function ("IWF"), comprising:
   first means for interrogating at least one entity selected from GSM network entities, UMTS network entities, and Inter-Working Functions by at least one interrogating operation selected from GSM MAP operations, UMTS MAP operations, and combinations thereof in order to retrieve a routing number and reach a destination subscriber who is a roaming subscriber roaming in a visited PLMN and set up the call;
   second means for extracting the calling subscriber number identification from a previously received signalling message to be further sent in an interrogating operation selected from OSM MAP operations, UMTS MAP operations, and combinations thereof; and
   third means for including the calling subscriber number identification extracted by the second means in the interrogating GSM/UMTS MAP operation in order to retrieve a routing number and reach such a roaming subscriber and set up the call, presenting the calling subscriber number identification.

2. The apparatus of claim 1, further comprising means for storing on a per subscriber and per call basis, at a GSM entity or a UMTS entity, the calling subscriber number identification received in an interrogating GSM/UMTS MAP operation for further delivery to the destination subscriber.

3. The apparatus of claim 1, wherein the interrogating GSM/UMTS MAP operation is a MAP operation: "Send Routing Information", and the MAP operation includes the calling subscriber number identification.

4. The apparatus of claim 1, wherein the interrogating GSM/UMTS MAP operation is a MAP operation: "Provide Roaming Number", and the MAP operation includes the calling subscriber number identification.

5. The apparatus of claim 1, wherein the home PLMN is one of a GSM network and a UMTS network that include a home GMSC; a visited PLMN where the home subscriber is roaming is neither a OSM network nor a UMTS network; the home GMSC interrogates a GSM/UMTS home location register ("HLR") by a MAP operation: "Send Routing Information" that includes the calling subscriber number identification; and the GSM/UMTS HLR interrogates an Inter-Working Function used in intersystem roaming by a MAP operation: "Provide Roaming Number" that also includes the calling subscriber number identification.

6. The apparatus of claim 1, wherein the visited PLMN where the home subscriber is roaming is one of a GSM network and a UMTS network; the home PLMN is neither a GSM network nor a UMTS network; and an Inter-Working Function used in intersystem roaming interrogates a visited mobile switching center/visitor location register ("MSCNLR") by a MAP operation: "Provide Roaming Number" that includes the calling subscriber number identification.

7. The apparatus of claim 1, wherein the home PLMN is one of a GSM network and a UMTS network that include a home GMSC; the visited PLMN where the home subscriber is roaming is also one of a GSM network and a UMTS network; the home GMSC interrogates a GSM/UMTS home location register ("H LR") by a MAP operation: "Send Routing Information" that includes the calling subscriber number identification; and the GSM/UMTS HLR interrogates a mobile switching center/visitor location register ("MSCNLR") where the home subscriber is roaming by a MAP operation: "Provide Roaming Number" that also includes the calling subscriber number identification.

8. The apparatus of claim 1, wherein the calling subscriber number identification is included as a new parameter of a predetermined, type in a MAP operation: "Send Routing Information".

9. The apparatus of claim 1, wherein the calling subscriber number identification is included in an Extension Container field of a MAP operation: "Send Routing Information".

10. The apparatus of claim 1, wherein the calling subscriber number identification is included as a new parameter of a predetermined type in a MAP operation: "Provide Roaming Number".

11. The apparatus of claim 1, wherein the calling subscriber number identification is included in an Extension Container field of a MAP operation: "Provide Roaming Number".

* * * * *